United States Patent [19]

Zukowski

[11] 4,334,041
[45] Jun. 8, 1982

[54] TWO-PHASE ETHYLENE-PROPYLENE BLOCK COPOLYMERIZATION PROCESS

[75] Inventor: Edward A. Zukowski, Clark, N.J.

[73] Assignee: El Paso Polyolefins Company, Paramus, N.J.

[21] Appl. No.: 283,777

[22] Filed: Jul. 16, 1981

Related U.S. Application Data

[63] Continuation-in-part of Ser. No. 177,296, Aug. 11, 1980, Pat. No. 4,284,738.

[51] Int. Cl.³ ............................................. C08F 297/08
[52] U.S. Cl. ...................................... 525/53; 525/243; 525/247; 525/323
[58] Field of Search ................. 525/243, 247, 323, 53

[56] References Cited

U.S. PATENT DOCUMENTS

| | | | |
|---|---|---|---|
| 3,318,976 | 5/1967 | Short | 525/247 |
| 3,401,212 | 9/1968 | Griffin | 525/243 |
| 3,514,501 | 5/1970 | Leibson et al. | 525/53 |
| 3,732,335 | 5/1973 | Hermans et al. | 525/247 |
| 3,830,787 | 8/1974 | Susa et al. | 260/94.9 |
| 3,917,746 | 11/1975 | Aishima et al. | 525/247 |
| 3,953,414 | 4/1976 | Galli et al. | 526/342 |
| 4,051,313 | 9/1977 | Luciani et al. | 526/496 |
| 4,115,319 | 9/1978 | Scata et al. | 252/429 B |
| 4,128,606 | 12/1978 | Furutachi et al. | 525/247 |
| 4,149,990 | 4/1979 | Giannini et al. | 252/429 B |

*Primary Examiner*—Stanford M. Levin
*Attorney, Agent, or Firm*—Fred S. Valles; Margareta LeMaire

[57] ABSTRACT

A process for the preparation of ethylene-propylene block copolymers at improved catalyst productivity rates involving the formation of a propylene prepolymer by polymerization of propylene in liquid phase in the presence of a catalyst system containing titanium halide supported on magnesium halide and aluminum alkyl complexed with an electron donor. Ethylene and propylene are block polymerized onto the prepolymer in a vapor phase reaction zone in the presence of further added quantities of similar catalyst components. The product of the process has higher ethylene and block contents as compared to products formed with none or only one of the components being added to the vapor phase reaction zone.

14 Claims, No Drawings

TWO-PHASE ETHYLENE-PROPYLENE BLOCK COPOLYMERIZATION PROCESS

This application is a continuation-in-part of copending application Ser. No. 177,296, filed Aug. 11, 1980, U.S. Pat. No. 4,284,738.

BACKGROUND OF THE INVENTION

In block polymerization, there is substantially effected a combination of the best physical and chemical properties of two or more polymers, for example, the combination of those of polypropylene with those of polyethylene. Thus, polyethylene, while not possessing melting points or tensile strengths as high as those of polypropylene, does in fact possess excellent low temperature properties such as brittleness and impact. When the outstanding properties of both of these polymers are combined in the technique of block polymerization, there results at once a heteropolymer useful in many applications for which neither homopolymer was practically useful.

A group of block copolymers, which have excellent physical properties, are the ethylene-propylene block copolymers, e.g., those of the type P-EP, where P denotes a propylene homopolymer preblock and EP is a post-block of ethylene-propylene copolymer. By varying the proportions of the blocks and the polymerized ethylene content, the physical properties can be closely controlled to fit the particular application for which the polymer products are intended. In general, at constant melt flow rates the impact strength at room temperature of the block copolymer is substantially directly proportional to the amount of polymerized ethylene in the total product.

Block copolymers are advantageously produced on a commercial scale by the process disclosed in U.S. Pat. No. 3,514,501. Briefly, this process involves preparation of the preblock, preferably in the liquid phase, by catalytic polymerization of propylene in a hydrocarbon diluent such as liquid propylene to form a slurry. After a separation of the slurry, the prepolymer which still contains active catalyst residues is introduced into at least one reaction zone, where it is reacted with monomer vapors for a sufficient period of time to form the polymer post block onto the polymer preblock in the desired proportions.

In the past, the conventional catalyst system used in such a polymerization process has been an unmodified or an electron donor-modified titanium halide component, activated with an organoaluminum cocatalyst. Typical examples of conventional propylene polymerization catalyst systems include cocrystallized titanium trichloride-aluminum trichloride catalysts of the general formula $n.TiCl_3.AlCl_3$ activated with diethylaluminum chloride or triethyl aluminum. The cocrystallized titanium trichloride-aluminum trichloride can have been subjected to a modification treatment with a suitable electron donor compound to increase its activity or stereospecificity. Such compounds include phosphorus compounds, ester of inorganic and organic acid ethers and numerous other compounds.

One major drawback, however, in using the aforementioned conventional catalysts, has been the low catalyst productivity, which has necessitated the subsequent deashing of the product to reduce the content of catalyst residues, which otherwise would detrimentally affect the product quality.

Recently new catalysts have been developed which are far more active than the aforementioned conventional catalysts in the polymerization of alpha-olefins. Briefly described, these catalysts are comprised of a titanium halide catalyst component supported on magnesium dihalide and an alkylaluminum compound, which can be present as a complex with an electron donor compound. These catalyst components have been described in the patent literature, e.g., in U.S. Pat. Nos. 3,830,787, 3,953,414, 4,051,313, 4,115,319, 4,149,990, 4,218,339, 4,220,554, 4,226,741 and 4,263,169.

The productivities obtained with these new catalysts are extremely high resulting in polymers containing such small quantities of residual catalyst that the conventional deashing step can be dispensed with. The catalysts function well in the homopolymerization of propylene and in the copolymerization of a mixture of propylene and another alpha-olefin such as ethylene, provided that the polymerization reaction is carried out in a liquid diluent, e.g., liquid propylene monomer. However, in the vapor phase polymerization used in preparing the EP copolymer block of P-EP block copolymer described above, using conventional operating conditions, it has been found that the product quality of the resulting block polymer has been substantially inferior. Specifically, in order to achieve a desired impact strength at a desired melt flow, it was found that considerably more ethylene had to be incorporated into the total polymer than is the case when employing conventional catalysts. The necessary increase in ethylene content to achieve the impact strength detrimentally affects other desirable properties of the final product such as stiffness, heat deflection temperature, tensile properties, etc.

As disclosed in copending U.S. patent application Ser. No. 64,961 filed July 27, 1979, now U.S. Pat. No. 4,284,739 significant improvements in impact strength can be achieved when the vapor phase polymerization is carried out with a monomer feed having an ethylene-to-propylene molar ratio in the narrow range of from about 0.15 to about 0.3. However, it has been found that at these rather low molar ratios, the total amount of ethylene that can be incorporated into the final product is somewhat restricted. Thus, the aforementioned improved process has been limited to the production of relatively low impact strength material.

This deficiency was overcome by carrying out the block copolymerization in accordance with the process of copending application Ser. No. 177,296, filed Aug. 11, 1980. In this process the vapor phase polymerization is conducted in the presence of further added quantities of aluminum trialkyl catalyst components amounting from about 5 to about 50% of the quantity used in the preparation of the propylene prepolymer. Significant increases in ethylene incorporation as well as in impact strength of the product are achieved by this process improvement. However, there are still some problems connected with the aforementioned process in that process control is somewhat difficult to maintain. For instance, heating and cooling requirements in the vapor phase reaction zone fluctuate considerably, and if not constantly monitored, can cause unwanted variations in polymerization temperature, productivity, and product quality. It sometimes results in a "sticky" polymer product with attending materials handling problems.

It is, therefore, an object of the present invention to provide a highly efficient process for the vapor phase polymerization of ethylene-propylene blocks onto a preformed propylene polymer yielding medium to high impact grade polymer products at high production rates and with high block incorporation.

Another object of the invention is to provide a process for the preparation of ethylene-propylene block copolymers wherein control of the process conditions is improved.

Further objects will become apparent from a reading of the specification and appended claims.

THE INVENTION

It has now been discovered that further improvements in productivity, in ethylene incorporation, in product properties as well as in processability can be obtained in the process of Ser. No. 177,296, described before, and hereby incorporated into this application by reference, provided that additional quantities of support titanium halide catalyst component be added to the vapor phase reaction zone and that the alkyl aluminum catalyst compound added to the vapor phase reaction zone be at least partially complexed with an electron donor compound at a mole ratio of alkyl aluminum to electron donor within a very narrow range and different from that used in the prepolymer preparation. It is also important that the temperatures of each of the prepolymer and vapor phase block polymerization zones be controlled within rather narrow limits or the extent of the above described improvements will be less or even completely counteractive.

In summary, the improved process of this invention comprises:

(A) preparing a propylene prepolymer in finely divided form and containing active catalyst residues by polymerizing propylene at a pressure sufficient to maintain propylene in liquid phase and at a temperature ranging between about 145° F. and about 160° F. in the presence of a catalyst composition containing the components:

(a) a first at least partial complex of an alkyl aluminum compound with an electron donor compound wherein the alkyl aluminum is selected from aluminum trialkyl or a mixture of aluminum trialkyl and a dialkyl aluminum halide and wherein the mole ratio of alkyl aluminum to electron donor is maintained between about 2 and about 5, and, (b) a complex of an electron donor compound with a titanium tri- or tetrahalide supported on magnesium dihalide, where the components (a) and (b) are being provided in a molar ratio of Al/Ti between about 40:1 and about 150:1, and separating the propylene prepolymer from volatile constituents;

(B) introducing the propylene prepolymer, ethylene and propylene into at least one continuously agitated vapor phase reaction zone;

(C) introducing to said vapor phase reaction zone:

(i) a quantity of a second at least partial complex of an alkyl aluminum compound with an electron donor compound, wherein the alkyl aluminum is selected from trialkyl aluminum or mixtures of trialkyl aluminum and dialkyl aluminum halide and wherein the mole ratio of alkyl aluminum to electron donor compound is maintained in a range from about 8:1 to about 15:1 and the quantity of aluminum alkyl compound is between about 15 to about 50% of the aluminum alkyl compound of component (a), and, (ii) an additional quantity of component (b) sufficient to provide a molar ratio of Al/Ti of components (i) and (ii) between about 75:1 and about 125:1;

(D) polymerizing said ethylene and propylene onto the propylene prepolymer in said vapor phase reaction zone at the temperature of from about 140° F. to about 170° F.

It is very important that the process conditions are maintained within the above mentioned limits. For instance, productivity is suppressed when the additional catalyst components provided to the vapor phase reaction zone are added instead with the catalyst used in the formation of the prepolymer. Productivity suppression also occurs when the prepolymerization temperature is outside the indicated range, the copolymerization temperature is too low, the Al/Ti ratio in either reaction zones is too low, or the alkyl/electron donor ratio is too low in either reaction zone. Also, when the above conditions occur in the vapor phase copolymerization zone, the ethylene incorporation is detrimentally affected. Unwanted product "stickiness" occurs when the temperature of the copolymerization zone and/or the alkyl/electron donor compound ratio in the copolymerization zone are too high. In the latter cases, control of the process is also difficult to maintain requiring constant supervision to prevent vapor upsets or shutdowns. Finally, the Al/Ti ratios should not be allowed above the upper limit since it results in a product containing substantial quantities of undesired catalyst residues, which affect the physical properties of the polymer product.

Propylene, optionally in admixture with minor amounts of other alpha-olefins of from about 2 to 10 carbon atoms or more can be employed to form the prepolymer. Such other alphaolefins include ethylene, butene-1, isobutene-1, pentene-1, hexene-1 and higher, as well as branched alpha-olefins such as 2-methyl butene-1, 4-methyl pentene-1 and higher. Of these monomers, propylene and mixtures of propylene and ethylene are of special interest and most preferred. When ethylene is a component, it is preferred that it be limited to a concentration of not more than about 2 wt % of the total monomer feed.

The prepolymer is formed in a reaction zone employing liquid propylene as substantially the sole diluent and a catalyst as described in detail below. The polymerization is carried out to a solids content of from 5 to 60%, but preferably 20 to 40%. The propylene functions as the liquid diluent as well as feed to the reaction, except for small quantities of inert hydrocarbons, e.g., propane, hexane, heptane, mineral oil, petrolatum, etc., that may be used for the introduction of the catalyst components into the reaction zone and also any minor quantities of $C_4$ and higher comonomer that may be used in the formation of the prepolymer.

The reaction is continuous and monomer feed and catalyst components are continuously fed to the reactor and a slurry of polymer product and liquid propylene is withdrawn, preferably through a cyclic discharge valve which simulates continuous operation. Various modifiers such as hydrogen may be added to alter the properties of the polymer product. Such modifiers are well known in the art and need not be discussed in any further detail since they form no part of this invention.

The catalyst components used in the process for preparing the prepolymer can be any one of the recently developed, high activity magnesium halide supported catalyst components and organoaluminum cocatalyst components disclosed e.g., in U.S. Pat. Nos. 3,830,787, 3,953,414, 4,051,313, 4,115,319, 4,149,990, 4,218,339, 4,220,554, 4,226,741 and 4,263,169, hereby incorporated in this application by reference.

Typically, such a catalyst composition is a two component composition where the components are introduced separately into the polymerization reactor.

Component (a) of such a composition is an alkyl aluminum having from 1 to 8 carbon atoms in the alkyl groups. It is advantageously selected from trialkyl aluminums or mixtures of trialkyl aluminums with up to about 30 mole % dialkylaluminum halide in said mixture. The preferred halide is chloride. Examples of suitable alkyl aluminums are diethylaluminum chloride, di-n-butylaluminum chloride, triethyl aluminum, tri-methyl aluminum, tri-n-butyl aluminum, tri-isobutyl aluminum, triisohexyl aluminum, tri-n-octyl aluminum, triisooctyl aluminum. The alkyl aluminum is complexed with an electron donor prior to introduction into the polymerization reactor. Best results are achieved when esters of carboxylic acids or diamines, particularly esters of aromatic acids are used as the electron donors.

Some typical examples of such compounds are methyl- and ethylbenzoate, methyl- and ethyl-p-methoxybenzoate, diethylcarbonate, ethylacetate, dimethylmaleate, triethylborate, ethyl-o-chlorobenzoate, ethylnaphthenate, methyl-p-toluate, ethyl-toluate, ethyl-p-butoxy-benzoate, ethylcyclohexanoate, ethyl-pivalate, N,N,N',N'-tetramethylenediamine, 1,1,4,-trimethylpiperazine, 2,5-dimethylpiperazine and the like. The molar ratio of aluminum alkyl to electron donor should be limited to a range between about 2 and about 5. Solutions of the electron donor and the alkyl aluminum compound in a hydrocarbon such as hexane or heptane are preferably prereacted for a certain period of time generally less than 1 hour prior to feeding the mixture into the polymerization reaction zone.

The other component of the catalyst composition is either a titanium tri- or tetrahalide supported on magnesium dihalide, or a complex of an electron donor compound with a titanium tri- or tetrahalide supported on magnesium dihalide. The halogen in the respective halides can be chlorine, bromine or iodine, the preferred halogen being chlorine. The electron donor, if it is used in forming a complex, is suitably selected from the esters of inorganic and organic oxygenated acids and the polyamines. Examples of such compounds are the esters of aromatic carboxylic acids, such as benzoic acid, p-metoxybenzoic acid and p-toluic acids and particularly the alkyl esters of said acids; the alkylene diamines, e.g., N,N,N',N'-tetramethylethylenediamine. The magnesium to electron donor molar ratio are equal to or higher than 1 and preferably between 2 and 10. Generally the titanium content expressed as titanium metal ranges between 0.1 and 20 wt % in the supported catalyst component and preferably between 1 and 3 wt %.

The preparation of such supported catalyst components has been described in the prior art and are commercially available.

The catalyst components (a) and (b) are fed to the prepolymer reaction zone in amounts such that the Al/Ti molar ratio is maintained preferably between about 40:1 and 150:1. The monomer feed to Ti metal weight ratio is usually in the range of 500,000 and 1,500,000.

Temperatures at which the prepolymer formation should be carried out are to be in the narrow range of from about 145° F. to about 160° F. The pressures in the prepolymer formation should be sufficient to maintain propylene in the liquid phase, usually between 400 and up to 500 psig or higher.

The prepolymer from the reaction zone is taken to a separation zone, such as a cyclone or a bag filter, wherein the volatile constituents are separated from the polymer and processed according to known techniques and recycled to the reaction zone, the amount of volatiles removed being sufficient so that less than 10% and preferably no more than 5% volatile content remains in the prepolymer.

In the vapor phase block polymerization, the polymer recovered from the separation zone and containing active catalyst residues, is taken to a continuously agitated reaction zone having provisions for introducing additional quantity of alkyl aluminum, ethylene monomer and propylene monomer at one or more points along the length of the zone (and inert gasses such as nitrogen) so that the active catalyst residues in the prepolymer and the added catalyst components cause said monomers to polymerize to a block thereby modifying the ultimate properties of the resin produced. The polymerization in the continuously agitated reaction zone is carried out at pressures lower than those used for the prepolymer preparation, i.e., pressures of 10 to 50 psig or somewhat higher. Polymerization temperatures should range from about 140° F. to about 170° F., and preferably from about 150° F. to about 160° F.

The ethylene and propylene monomers do not require premixing prior to introduction into the vapor phase zone; in fact, it is sometimes more advantageous to separately introduce each of the monomers at one or preferably several points along the reactor length. Preferably, at least a portion of the propylene is introduced as a liquid which upon vaporization will remove some of the heat of polymerization generated in the reaction zone.

The molar ratio of the total ethylene to total propylene introduced to the vapor phase reaction zone is usually maintained at a value of at least within the range of from about 0.15, and preferably, between about 0.2 and about 0.4.

The additional amounts of catalyst components are usually introduced separate from each other at points near the reactor inlet, e.g., in admixture with one of the monomer feed streams such as liquid propylene.

The alkyl aluminum catalyst component is complexed with any of the aforementioned electron donors suited for such complexing. It is usually added in quantities of from about 15 to about 50% of that added in the polymerization of the prepolymer and preferably the additions amount to between about 20 and about 35%. The ratio of alkyl/electron donor should be different from that used in the formation of the prepolymer, i.e., in the range of from about 8:1 to about 15:1 and preferably between about 10:1 and about 14:1. The supported titanium halide component is added in quantities sufficient to provide a Al/Ti mol ratio of the additional catalyst components in the range from about 75:1 to about 125:1. Apart from differences in proportions used, the added catalyst components of the block copolymerization are generally identical to those used in the formation of the prepolymer.

Generally from about 5 to about 40 percent by weight of block based on the weight of the total polymer is produced in the total block polymerization reactor system.

Suitable continuously agitated reaction zones include those disclosed in U.S. Pat. No. 3,514,501, incorporated into this application by reference. The reaction zone can be one or more pipe line reactors in series with optional jacketing for heat removal and suitable monomer introduction points as well as agitating means. According to the preferred embodiment of this invention, one or more horizontal ribbon blender reactors are provided for the continuous operation. Such reactors are equipped internally with a series of ribbon blades and-/or paddles rotated by a power drive. By suitable arrangement of the agitation equipment, the polymer can be moved continuously from the inlet to the outlet. The polymer powder substantially independent of any agitation, behaves much like a fluid and "flows" or moves from the inlet end of the reactor to the outlet end, that is, flows along the length of the reactor in much the same manner as a fluid like a liquid would.

Propylene is provided at least to the inlet of the reactor and if liquid propylene monomer is used, it is preferably also provided through inlet spray nozzles spaced along the upper portion of the reactor. Ethylene monomer feed in vapor form can be introduced in similar fashion at points along the length of the reactor. The reactor is advantageously provided with an external cooling jacket for removal of heat through the reactor wall. Additional vapor-phase reactors can be provided in series with the block polymerization reactor for the purpose of increasing residence time. If desired, any of the various known modifiers may be added to one or more reactor for their intended purpose.

Because of the generally high productivity of the supported catalyst system expressed in terms of pounds of polymer produced per pound of titanium metal, which productivity has been further enhanced by the present invention, there is no need to remove catalyst residues from the polymer in a deashing step as is the case with conventional catalyst.

The polymer products provided in accordance with this invention have a meltflow range between about 0.1 and about 10 g/10 min., ratio of weight-average molecular weight to number-average molecular weight of above about 6.5, ethylene content of at least about 1, preferably above about 4 wt %, Ti content not exceeding about 3 ppm, Mg content not exceeding about 40 ppm, Cl content not exceeding about 100 ppm and total ash content not exceeding about 400 ppm.

Specific advantages of the polymers of this invention compared to conventional polymers include wider processability range, lower processing energy requirements, superior ability to fill thin sections and multiple cavity molds, better drawdown, easier drawability and higher processing speed in the continuous filament and staple fiber production.

For example, based on spiral meltflow measurements, it was found that polymers of this invention having meltflows (ASTM-1238 Condition L) in the range of about 2–10 g/10 min. can be processed at 50°–30° F. lower molding temperatures, or 350–150 psi lower molding pressures than conventional polymers of the same meltflows (ASTM-1238) and total ethylene content.

It is believed that the molecular weight distribution, Mw/Mn is the property that best relates to the improvements in impact strength as well as polymer rheological properties and processability. Typically, polymerization with a conventional catalyst system would result in a polymer product having a Mw/Mn ratio of at most 6.5 and generally below 6, while the polymers of this invention have Mw/Mn ratios of at least 6.5, e.g., between about 7 and about 10.

Various additives can, if desired, be incorporated into the polypropylene resin, such as fibers, fillers, antioxidants, metal deactivating agents, heat and light stabilizers, dyes, pigments, lubricants and the like.

The polymers can be used with advantage in the manufacture of fibers, filaments and films by extrusion; of rigid articles by injection molding; and of bottles by blow molding techniques.

The following examples further illustrate the advantages obtained by the invention.

EXAMPLES 1–5

The experiments were conducted in large scale continuous operations. The prepolymerization conditions were substantially identical in each of the experiments. Propylene and catalyst components were continuously charged to a stirred reactor, the monomer feed rate was adjusted corresponding to a reactor residence time of 1.8 hours. The organoaluminum compound of the catalyst system was a heptane solution of 75 mol % triisobutyl aluminum (TIBA) and 25 mol % diethyl aluminum chloride (DEAC). The alkyl aluminum compound mixture had been treated prior to introduction into the reactor with heptane solution of methyl-p-toluate (MPT), an electron donor compound. The mole ratio of alkyl aluminum to MPT was maintained at 4:1. The solid, magnesium halide supported titanium halide catalyst component was a commercially available catalyst which contained about 1.5 wt % titanium, 20.3 wt % magnesium, 60.0 wt % chlorine and 9.6 wt % hydrocarbon volatiles. Ethylbenzoate had been used in the manufacture of the supported catalyst component. The two catalyst components were added at a mol ratio of Al/Ti of about 50:1 and at rates directly proportional to the polymer production rates and in amounts sufficient to maintain a polymer solids concentration in the reactor slurry at a nominal value of about 40%. The average catalyst productivity was about 425,000 lb polymer/lb of Ti metal.

After separation from unreacted propylene, the prepolymer was fed sequentially to two serially connected, water-cooled jacketed horizontal reactors, each provided with ribbon blades as agitation means. The combined residence times in the two reactors were 3 hours in each instance. A portion of the propylene feed was introduced as a liquid to the reactors to aid in the temperature control as well as in the introduction of catalyst components into the first of the vapor phase reactors. Ethylene monomer was added through inlets spaced evenly across each of the reactors. The block copolymer product was recovered from the outlet of the second reactor, which was maintained at substantially the same conditions of temperature and pressure as those prevailing in the first vapor phase reactor. The beneficial effects of operating the process within the limits of the invention are demonstrated by the results of Examples 3 and 4, wherein both block and ethylene incorporation were improved over those obtained in Example 1 where no additional titanium catalyst was provided to the vapor phase reaction zone, as well as over those of Example 2 where the alkyl/MPT mole ratio was below the lower limit. Also the temperature control of the block copolymerization was superior in each of Examples 3 and 4 as compared to the poor controls of either of Examples 1, 2 and 5, in which the alkyl/MPT ratios of the added alkyl catalyst component to the vapor phase reaction zone were in each case outside the limits of the invention. In fact, the product of Example 5 was too sticky to obtain a representative sample to analyze and handling of the product was difficult.

TABLE 1

| Example No. | 1 | 2 | 3 | 4 | 5 |
|---|---|---|---|---|---|
| Prepolymer Prod. | | | | | |
| Temp. - °F. | ←—155—→ | | | | |
| Pressure - psig | ←—425—→ | | | | |
| Al/Ti mole ratio | ←— 50 —→ | | | | |
| Alkyl/MPT mole ratio | ←—4.0—→ | | | | |
| Residence time - hrs. | ←— 1.8—→ | | | | |
| Productivity - 1000 lbs/lb Ti | ←—425—→ | | | | |
| Block Copolymer Prod. | | | | | |
| Temp. - °F. | 160 | 160 | 160 | 160 | 160 |
| Pressure - psig | 27 | 27 | 27 | 27 | 27 |
| E/P mole ratio | 0.28 | 0.28 | 0.27 | 0.25 | 0.22 |
| Additional Ti catalyst addition | No | Yes | Yes | Yes | Yes |
| Additional alkyl addition | Yes | Yes | Yes | Yes | Yes |
| Alkyl amount (% of initial) | 30 | 33 | 34 | 32 | 32 |
| Alkyl/MPT mole/mole | N/A | 5 | 10 | 13 | 16 |
| Residence time - hrs. | 3 | 3 | 3 | 3 | 3 |
| Ethylene Content - wt % | 4.5 | 5.5 | 6 | 6 | (1) |
| Block Content - wt % | 9.5 | 13.5 | 16.5 | 17.5 | (1) |
| Temperature Control | Poor | Poor | Improved | Good | Poor |

(1) Powder too sticky to analyze.

The properties of the polymer product of Example 4 are shown in Table 2.

TABLE 2

| Melt Flow g/10 min | 3.0 |
|---|---|
| Ethylene wt % | 5.8 |
| Notched Izod ft-lb/in | 2.4 |
| Flex. Modulus psi × $10^5$ | 1.52 |
| Tensile Modulus psi × $10^5$ | 1.55 |
| Heat Deflection Temp. °C. | 88 |
| Hardness (Rockwell) | 73 |

It is obvious to those skilled in the art that many variations and modifications can be made to the process and the block copolymer of this invention. All such departures from the foregoing specification and considered within the scope of this invention as defined by the specification and the appended claims.

What is claimed is:

1. A continuous sequential vapor phase block copolymerization process for the production of impact resistant ethylene-propylene polymers at high productivity rates, which comprises:
    (A) preparing a propylene prepolymer in finely divided form and containing active catalyst residues by polymerizing propylene at a pressure sufficient to maintain propylene in liquid phase and at a temperature ranging between about 145° F. and about 160° F. in the presence of a catalyst composition containing the components:
        (a) a first at least partial complex of an alkyl aluminum compound with an electron donor compound wherein the alkyl aluminum is selected from aluminum trialkyl or a mixture of aluminum trialkyl and a dialkyl aluminum halide and wherein the mole ratio of alkyl aluminum to electron donor is maintained between about 2 and about 5, and,
        (b) a complex of an electron donor compound with a titanium tri- or tetrahalide supported on magnesium dihalide, where the components (a) and (b) are being provided in a molar ratio of Al/Ti between about 40:1 and about 150:1, and,
    separating the propylene prepolymer from volatile constituents;
    (B) introducing the propylene prepolymer, ethylene and propylene into at least one continuously agitated vapor phase reaction zone;
    (C) introducing to said vapor phase reaction zone:
        (i) a quantity of a second at least partial complex of an alkyl aluminum compound with an electron donor compound, wherein the alkyl aluminum is selected from trialkyl aluminum or mixtures of trialkyl aluminum and dialkyl aluminum halide and wherein the mole ratio of alkyl aluminum to electron donor compound is maintained in a range from about 8:1 to about 15:1 and the quantity of aluminum alkyl compound is between about 15 to about 50% of the aluminum alkyl compound of component (a), and,
        (ii) an additional quantity of component (b) sufficient to provide a molar ratio of Al/Ti of components (i) and (ii) between about 75:1 and about 125:1,
    (D) polymerizing said ethylene and propylene onto the propylene prepolymer in said vapor phase reaction zone at the temperature of from about 140° F. to about 170° F.

2. A process according to claim 1, wherein the propylene prepolymer is propylene homopolymer.

3. A process according to claim 1, wherein the temperature of step (D) is ranging between about 150° F. and about 160° F.

4. A process according to claim 1 wherein the pressure of step (D) is between about 10 psig and about 50 psig.

5. A process according to claim 1, wherein the ethylene and propylene monomers are introduced in step (B) in a molar ratio of ethylene to propylene of from about 0.2 to about 0.4.

6. A process according to claim 1, wherein the mole ratio alkyl aluminum to electron donor of component (i) is maintained in the range of from about 10:1 and about 14:1.

7. A process according to claim 1, wherein the alkyl aluminum is one containing from 1 to 8 carbon atoms in the alkyl groups.

8. A process according to claim 1, wherein the alkyl aluminum is a mixture of a trialkyl aluminum and up to about 30 mole % dialkylaluminum halide.

9. A process according to claim 1, wherein the trialkylaluminum is triisobutyl aluminum.

10. A process according to claim 1, wherein the dialkylaluminum halide is diethylaluminum chloride.

11. A process according to claim 1, wherein the electron donor compounds of components (a) and (i) are esters of aromatic acids.

12. A process according to claim 11, wherein the ester is methyl-p-toluate.

13. A process according to claim 1, wherein the electron donor compound of component (b) is an ester of an aromatic acid.

14. The process of claim 13, wherein the ester is ethylbenzoate.

* * * * *